United States Patent
Shumka et al.

(10) Patent No.: US 11,228,941 B2
(45) Date of Patent: Jan. 18, 2022

(54) METHODS, MATERIALS AND APPARATUS FOR CLEANING AND INSPECTING GIRTH GEAR SETS

(71) Applicant: CLEANSOLV INTERNATIONAL LTD., Kelowna (CA)

(72) Inventors: Thomas Shumka, Kelowna (CA); Jason Shumka, Kelowna (CA)

(73) Assignee: Cleansolv International LTD

( * ) Notice: Subject to any disclaimer, the term of this patent is extended or adjusted under 35 U.S.C. 154(b) by 0 days.

(21) Appl. No.: 17/000,193

(22) Filed: Aug. 21, 2020

(65) Prior Publication Data

US 2020/0384508 A1 Dec. 10, 2020

Related U.S. Application Data

(63) Continuation of application No. 16/243,919, filed on Jan. 9, 2019, now Pat. No. 10,786,834, which is a
(Continued)

(30) Foreign Application Priority Data

Jul. 10, 2017 (WO) ................ PCT/CA2017/000172

(51) Int. Cl.
| | |
|---|---|
| *F16H 57/01* | (2012.01) |
| *H04W 28/08* | (2009.01) |
| *H04W 16/14* | (2009.01) |
| *H04W 72/04* | (2009.01) |
| *H04W 72/12* | (2009.01) |
| *B08B 3/02* | (2006.01) |
| *B08B 3/04* | (2006.01) |

(Continued)

(52) U.S. Cl.
CPC ......... *H04W 28/085* (2013.01); *H04W 16/14* (2013.01); *H04W 72/0453* (2013.01); *H04W 72/1252* (2013.01); *B08B 3/022* (2013.01); *B08B 3/041* (2013.01); *B08B 3/08* (2013.01); *F16H 57/01* (2013.01); *F16H 2057/012* (2013.01); *G01N 27/9006* (2013.01); *H04W 72/14* (2013.01)

(58) Field of Classification Search
CPC .................................................. F16H 2057/016
USPC ......................................................... 324/242
See application file for complete search history.

(56) References Cited

U.S. PATENT DOCUMENTS

| | | | | |
|---|---|---|---|---|
| 2014/0347043 | A1* | 11/2014 | Chana ................. | G01M 13/021 324/242 |
| 2019/0049005 | A1* | 2/2019 | Clark ...................... | F16H 63/48 |

(Continued)

*Primary Examiner* — Gregory E Webb
(74) *Attorney, Agent, or Firm* — Baumgartner Patent Law; Marc Baumgartner

(57) ABSTRACT

A one-step method of cleaning a girth gear set of a mill in preparation for inspection is provided, the method comprising: substantially emptying the mill; inching the gear; spraying a low, very low or non-Volatile Organic Compound (VOC) cleaning formulation at high pressure onto the gear, the cleaning formulation comprising a non-VOC aliphatic hydrocarbon solvent, an extreme pressure lubricant, a fretting wear lubricant, a non-ionic surfactant, and a mixture of non-VOC unsaturated fatty alcohols; and continuing to spray the low or very low VOC cleaning formulation on the gear for sufficient time for the formulation to clean the gear, thereby providing a so cleaned gear.

17 Claims, 4 Drawing Sheets

Related U.S. Application Data continuation-in-part of application No. PCT/CA2017/000172, filed on Jul. 10, 2017.

(60) Provisional application No. 62/361,995, filed on Jul. 13, 2016.

(51) Int. Cl.
 *B08B 3/08* (2006.01)
 *G01N 27/90* (2021.01)
 *H04W 72/14* (2009.01)

(56) References Cited

U.S. PATENT DOCUMENTS

| | | | | |
|---|---|---|---|---|
| 2019/0143381 A1* | 5/2019 | Shumka | ............ | H04W 72/1252 |
| | | | | 134/32 |
| 2020/0049662 A1* | 2/2020 | Shumka | ............... | G01N 27/904 |
| 2020/0384508 A1* | 12/2020 | Shumka | ............ | H04W 72/1252 |

* cited by examiner

METHODS, MATERIALS AND APPARATUS FOR CLEANING AND INSPECTING GIRTH GEAR SETS

CROSS REFERENCE TO RELATED APPLICATIONS

This application is a continuation of U.S. patent application Ser. No. 16/243,919, filed on Jan. 9, 2019, which is a Continuation-in-Part of International Patent Application No. PCT/CA2017/000172, filed on Jul. 10, 2017, which claims the benefit of U.S. Provisional Application No. 62/361,955, filed on Jul. 13, 2016. The above-identified priority patent applications are incorporated herein by reference in their entirety.

FIELD

The present technology relates to a method and formulation for cleaning girth gear sets and method and apparatus for then inspecting the gears. More specifically, the formulation is a low or very low volatile organic compound (VOC) formulation that cleans quickly and is low cost. Cleaning can be done at very low speed or at high speed.

Non-destructive testing follows directly with an eddy current array (ECA) probe or a phased array ultrasound probe. A rigid ECA probe is used for girth gears and includes accelerometers, an integral positioning encoder and a multiplexer for improved accuracy. They may also be used for final inspection during the gear manufacturing process. A flexible ECA probe is used for pinion gears and includes accelerometers. More specifically, the method uses a rigid eddy current sensor array to assess the integrity of large ring (girth) gears and a flexible ECA probe to assess the integrity of pinion (helical) gears on site and in situ. The device and method are especially useful for pinion gears.

BACKGROUND

All processing facilities that use Girth Gear Driven Mills, such as the mining, pulp and paper and cement industry, use large gears. For example, the girth gear has straight cut teeth and is about 3 m to about 14 m in diameter. The pinion gear drives the girth gear. It is much smaller, at about 0.5 m to about 2 m diameter. It has helix angles on the gear teeth. These gears cannot be readily removed and transported for testing.

Methods of examining large girth gear teeth to detect surface breaking discontinuities have often been time-consuming and limited in terms of data collected. Methods such as visual and magnetic particle inspection and liquid penetrant testing requires up to 24 hours to clean the gear, resulting in down time of up to 40 hours. These methods can miss critical discontinuities.

Typically, a gear could be inspected as frequently as every six months or as long as every two years, usually dependent on the insurance company's recommendations, which are based on their risk assessment. Hence, there are no personnel dedicated to conducting the testing. As these gears cost as much as 400,000 to 1.3 million dollars, an incorrect or inaccurate inspection result can cost the mining, cement or pulp and paper company a significant amount of money. Further, if there is a failure of the gear, this can lead to significant down time. For a copper-molybdenum, gold, iron ore mine this can be in the range of $20,000 to $100,000 an hour. It normally takes a minimum of 10 to 12 days to change out a gear set, if there is one on site. If not, it could take up to 45 weeks for a replacement. A catastrophic failure in these gear sets could cost the insurer millions of dollars.

These large gears need to be cleaned prior to inspection or maintenance. During part of the cleaning process, the mill cannot be used, and therefore the longer the process takes, the more down time there is. Most cleaning methods and inspection methods take between 10 and 12 hours and can take as much as two days.

Chemical cleaning reduces the time to clean a gear. The earlier chemical formulations included chemicals that are dangerous to human health and environmentally unfriendly. For example, methylene chloride-based solvents were used. These are toxic to both the environment and to humans. VOCs, such as most petroleum distillates, have also been used. While these are not as toxic as methylene chloride, they are still considered to be dangerous to work with and are environmentally unsafe.

Another deficiency in the prior art chemical cleaning methods is that the gear teeth were rinsed with water based detergents or water. During the rinsing, the gear teeth, as they rolled through mesh, were subjected to metal to metal contact. This led to scuffing and micro-pitting, eventually leading to potential gear teeth cracking and eventually failure.

A formulation and method for cleaning girth gears is disclosed in U.S. Pat. Nos. 5,031,648 and 5,146,938. The method is a two-step method involving spraying a thixotropic formulation on the gear while the gear is in operation. The composition comprises at least one terpene being capable of dissolving or softening hardened lubricants and residuals, hydrocarbon solvent, an extreme pressure lubricant and surfactants. The method for cleaning mill gears comprises applying a solution comprising at least one terpene being capable of dissolving or softening soils containing grease or oil, aliphatic hydrocarbon solvent, biodegradable surfactants, an extreme pressure lubricant and thickeners to the area to be cleaned, continuously applying the solution to contact the surface and penetrate and dissolve the surface grease, and thereafter rinsing the surface to remove the dissolved surface greases and the cleaning composition. The initial spraying is carried out during production, with the mill gear operating at full speed, followed by rinsing or wiping as the mill gear is inched. The composition dissolves gear lubricant (Asphaltic) accumulations effectively and in an environmentally acceptable manner as well as a method of cleaning mill gears resulting in significant savings in terms of labor and downtime of the equipment. The solution is safe to use on painted surfaces and emulsifies quickly when sprayed with water-soap solutions. The hydrocarbon solvent includes mineral spirits, which, in the commercial embodiment, Traxol®, is a middle petroleum distillate, which is classified as a VOC. As disclosed, the hydrocarbon solvent also includes aromatics, which are both VOCs and carcinogenic. The preferred terpene is d-limonene. The resulting formulation has a relatively low flash point of 142° F. and is a VOC. The formulation does not work well on synthetic lubricants. The formulation is sprayed on the gear for about 1.5 to 2 hours, hence a large amount of the formulation is required (600-800 litres). Rinsing is done with a detergent-water solution. During the rinsing the gear is inched. This step takes approximately 20 to 30 minutes. During this time, there is no protection for the gear as there are no additives in the rinse solution and as a consequence, this method has been found to damage the gear teeth.

Eddy current technology is a widely used for quality control testing on objects such as wire, rods or tubes. This testing often involves having the test objects travel along a work path, passing through eddy current probe(s). The operators are competent as they routinely conduct tests.

Eddy current testing can be performed on discs and other shaped objects constructed of conductive and/or non-magnetic materials to look for defects and wear. Eddy current testing may use eddy current coils designed to generate a changing magnetic field that may interact with the disc to generate an eddy current. Variations in the phase and magnitude of the generated eddy current may be measured by measuring changes to the current flowing in the coil. Alternatively, changes in phase and magnitude of the generated eddy current may be measured using a second coil. Changes in the phase and magnitude of the generated eddy current may indicate one or more flaws in the discs, such as small cracks that may lead to failures if not addressed. Due to their small size and rigidity, such probes make inspection of large discs and other large components that have varying and multiple geometries difficult and time-consuming, and therefore expensive.

Eddy current sensor arrays (ECA), or eddy current sensors have been employed to measure stress on airplane parts, for example, on the landing gear, and to measure weights of components. For example, U.S. Pat. No. 8,237,433 discloses methods for monitoring of stresses and other material properties. These methods use measurements of effective electrical properties, such as magnetic permeability and electrical conductivity, to infer the state of the test material, such as the stress, temperature, or overload condition. The sensors, which can be single element sensors or sensor arrays, can be used to periodically inspect selected locations, mounted to the test material, or scanned over the test material to generate two-dimensional images of the material properties. Magnetic field or eddy current based inductive and giant magneto-resistive sensors may be used on magnetizable and/or conducting materials, while capacitive sensors can be used for dielectric materials. Methods are also described for the use of state-sensitive layers to determine the state of materials of interest. These methods allow the weight of articles, such as aircraft, to be determined. The operators are competent as they routinely conduct testing.

Eddy current arrays, as opposed to eddy current sensors, can be used in production and inspection lines. For example, U.S. Pat. No. 8,264,221 discloses an eddy current probe assembly suitable for inspecting a test object with longitudinal shape, being passed through the assembly in the object's axial direction during an inspection session, the probe assembly comprising multiple probe modules being disposed in a radial plane and with the modules partially overlaying on each other forming an IRIS structure encircling an inspection zone, wherein a movement in unison of each of the probe modules closer to or further away from the center of the inspection zone makes the inspection zone enlarged or contracted. Spring tension is applied on each of the probe modules so that constant lift-off is maintained between the probe modules and the test surface.

Array of eddy current elements for each probe module and multiple layers of probe modules can be employed to achieve complete coverage of the test surface. The radial cross-sectional shapes of the test objects can be of round or polygonal. Again, testing is routine and therefore the operators are competent.

Flexible ECA probes that are strap-like have been disclosed that lack any form of protective coating. These can be pressed into round-edged shapes, for example, pipeline, tube inspection, and aircraft. However, they are only useful for assessing wear and integrity of smooth surfaces and are subject to wear if used on hard edges or rough surfaces.

A patent pending flexible probe array (FPA) configured in a glove that can be worn by an inspector has been disclosed (US Publication No. 20160025682). The FPA conforms to the inspection surface and allows inspection of a wide region with each scan of the array. With this arrangement, the operator receives tactile feedback of surface profile changes and is able to adjust the pressure on the FPA to accommodate changing geometries. The FPA approach eliminates the need to maintain probe alignment and the raster scanning needed with a conventional probe. The system has been successfully demonstrated at four operating power plants. A major deficiency is that it relies heavily on the proficiency of the user and therefore there is a risk of human error. Further, the results would vary from operator to operator as there is no accurate feedback to the operator to ensure consistency between operators. In addition, the scan coverage on the glove is very small.

In general, scan speed is an important parameter when inspecting using ECA. If scanning is too fast in relation to the sampling rate, the inspection may not be accurate. If scanning is too slow, again the accuracy may be affected. For standard or custom surface array probes, a positioning encoder may be attached to the ECA probe to monitor the speed and to record where indications are found. Such an encoder adds bulk and interferes with the probe when scanning is being conducted on the root of a gear tooth.

The ECA systems include a multiplexer, which is built into the electronic instrumentation or in the probe. The distance between the probe and the multiplexer can result in crosstalk.

What is needed is a more environmentally friendly formulation and method for cleaning girth gears. The formulation would preferably not include a VOC aliphatic hydrocarbon solvent. Preferably, the formulation would have a high flash point. Preferably, the method would be a one-step method that could be done quickly and without significant runoff of harmful chemicals. Preferably, the formulation would be able to remove synthetic and asphaltic lubricants. Preferably, the formulation would not be classified as a dangerous good and therefore would be an unclassified product. Preferably, the cost of production of the formulation could be lowered by reducing the number of components needed. Preferably the formulation would be a low or very low VOC formulation. Preferably, the method would be rinse-free. Preferably the method would reduce or remove the potential for damaging the gear teeth. The method of inspecting the gears would preferably follow directly after cleaning the gears and would use an eddy current array probe designed for gears. The method and ECA probe would be suited for field testing to accurately and quickly identify anomalies or defects on the gear flank and root of the gear teeth, including, but not limited to pits, scuffing, and cracks. The method would also preferably be useful for different shapes and sizes of gear teeth. For pinion gears, a flexible probe would be preferred. The probes (both rigid and flexible probes) would preferably be long lived and have a surface that was wear resistant. It would be preferred if the multiplexer was integrated into the probe and the positioning encoder was embedded in the probe. It would be advantageous if the resulting data were sent to a computing device, analyzed, displayed in two or three dimensions (C-Scan), or both and archived. It would be of more advantage if the system was able to identify indications of a minimum of 3/16" in accordance with the standards of the American Gear Manufacturer's Association.

SUMMARY

The present technology provides a more environmentally friendly formulation and method for cleaning girth gears. The formulation contains a non-VOC aliphatic hydrocarbon solvent. The formulation has a high flash point. The method is a one-step method that can be done quickly and without significant runoff of harmful chemicals. The formulation can remove synthetic and asphaltic lubricants. The formulation is not classified as a dangerous good under the Transportation of Dangerous Goods Act (TDG) and is therefore an unclassified product. The cost of production of the formulation is lower, as the method allows for a reduction in the number of components needed. The formulation is a low VOC or very low VOC formulation. The method is rinse-free. The method reduces or removes the potential for damaging the gear teeth. Inspection of the gears visually, or with an ECA probe, a Phased Array Ultrasonic (PAUT) probe, an Ultrasonic probe, 3-dimensional laser, an Alternating Current Field Measurement (ACFM) probe or Electromagnetic Acoustic Transducer (EMAT) can be done immediately after cleaning, with no need for additional steps. Inspections using Magnetic Particle or Dye Penetrant are preceded with rinsing with a detergent or wiping.

The ECA probe and method of ECA inspection is suited for field testing to accurately and quickly identify anomalies or defects on the gear flank and root of the gear teeth, including, but not limited to pits, scuffing, and cracks. The method can be useful for different shapes and sizes of gear teeth. For pinion gears, a flexible probe is preferred. The probes (both rigid and flexible) are long-lived and have a surface that is wear resistant. The multiplexer is integrated into the probe and the positioning encoder is embedded in the probe. The resulting data are sent to a computing device, analyzed, displayed in two or three dimensions (C-Scan), or both and archived. The system is able to identify indications of a minimum of 3/16" in accordance with the standards of the American Gear Manufacturer's Association.

In one embodiment, a method of cleaning one or more of a girth gear tooth of a mill and a pinion gear tooth of the mill in preparation for inspection, the method comprising: spraying a low or very low Volatile Organic Compound (VOC) cleaning formulation onto the gear tooth, the cleaning formulation comprising a non-VOC aliphatic hydrocarbon solvent, an extreme pressure lubricant, a fretting wear lubricant, a non-ionic surfactant, and a mixture of non-VOC unsaturated fatty alcohols; and continuing to spray the low or very low VOC cleaning formulation on the gear tooth for sufficient time for the formulation to clean the gear tooth, thereby providing a so cleaned gear.

In the method, spraying may be at high pressure as the mill is inched.

In the method, the high pressure may be about 1500 to about 5000 psi.

In the method, the mill may be inched between one to about three revolutions.

In the method, the non-VOC aliphatic hydrocarbon solvent may be hydrotreated light naphtha.

In the method, the low or very low VOC cleaning formulation may comprise about 53% to about 70% w/w hydrotreated light naphtha, about 1% w/w non-ionic surfactant, about 7% to about 17% w/w unsaturated fatty alcohols, about 0.5% to about 4% w/w fretting wear lubricant and about 3% to about 14% w/w extreme pressure lubricant.

In the method, the formulation may further comprise about 9% to about 15% w/w terpineol.

In the method, the formulation may further comprise about 10% Group I-III base oil.

In the method, the formulation may comprise about 67% hydrotreated light aliphatic naphtha, about 10% extreme pressure lubricant, about 13% terpineol, about 9% unsaturated fatty alcohols and about 1% non-ionic surfactant.

The method may further comprise inspecting the so cleaned gear tooth using one or more of an Eddy Current Array (ECA) probe, a Phased Array Ultrasonic (PAUT) probe, an Electromagnetic Acoustic Transducer (EMAT), an Alternating Current Field Measurement (ACFM) probe and a 3-dimensional Laser Scanner.

In the method, the inspecting may use the ECA probe.

The method may further comprise monitoring a scan speed with the ECA probe, the ECA probe including an at least one Micro Electromechanical (MEMS) accelerometer, a red, green, blue light source and a processor, the processor in electronic communication with the MEMS accelerometer and the red, green, blue light source.

In the method, the so cleaned gear tooth may be a girth gear tooth and the ECA probe may be a rigid ECA probe.

In the method, the so cleaned gear tooth may be a pinion gear tooth and the ECA probe may be a flexible ECA probe.

In another embodiment, a method of examining an at least one girth gear tooth on site is provided using a system comprising a rigid eddy current sensor array probe in electronic communication with a computing device, the computing device having a processor and a memory, the memory to provide instructions to the processor, the rigid eddy current sensor array probe including a housing, a sensor layer retained in the housing, a resilient surface retained on the sensor layer, and a sensor zone in the sensor layer proximate the resilient surface, and comprising a series of drive coils and a series of sensing coils, the method comprising: standardizing the eddy current sensor array probe with a reference standard; scanning the at least one gear tooth with an alternating current; sending a data set to the computing device; the computing device analyzing the data set; and the computing device displaying one or more of a two or three-dimensional image of the data set on a user interface.

In the method, the resilient layer may be a removable Ultra High Molecular Weight adhesive-backed plastic film and the method may further comprise assessing wear of the resilient layer and, if worn, replacing the resilient layer.

The method may be conducted in the absence of re-standardizing the rigid eddy current sensor array probe.

The method may further comprise the computing device archiving the data set.

The method may further comprise multiplexing the data set.

In the method, a plurality of gear teeth may be examined for a surface discontinuity.

In the method, on site may be a mine site.

In another embodiment, a method of examining an at least one girth gear tooth on site is provided using a system comprising a rigid eddy current sensor array probe in electronic communication with a computing device, the computing device having a processor and a memory, the memory to provide instructions to the processor, the rigid eddy current sensor array probe including a housing, the housing retaining: an at least one Micro Electromechanical (MEMS) accelerometer; a red, green, blue light source; a processor, the processor in electronic communication with the MEMS accelerometer and the red, green, blue light source; and a sensor layer, a resilient surface retained on the sensor layer, and a sensor zone in the sensor layer proximate the resilient surface, and comprising a series of drive coils and a series of sensing coils, the method comprising: standardizing the eddy current sensor array probe with a reference standard; scanning the at least one gear tooth with an alternating current; sending a data set to the computing device; the computing device analyzing the data set; and the computing device displaying one or more of a two or three-dimensional image of the data set on a user interface.

In another embodiment, system for assessing integrity of a girth gear on site is provided, the system comprising: a rigid eddy current sensor array probe, the eddy current sensor array probe including a housing, a sensor layer retained in the housing, a resilient surface retained on the sensor layer, and a sensor zone in the sensor layer, the sensor zone comprising a series of drive coils and a series of sensing coils, both series located proximate the resilient layer, a multiplexer in communication with the series of sensing coils, a plurality of data channels in communication with the multiplexer; a computing device in electronic communication with the series of drive coils, the computing device including a processor and a memory, the memory to provide instructions to the processor; and a user interface.

In the system, the resilient layer may be a removable Ultra High Molecular Weight adhesive-backed flexible plastic film.

In the system, the series of sensing coils may be arranged in an at least two rows, the at least two rows offset by a half of a coil.

In the system, the rigid eddy current array probe may further comprise an at least one Micro Electromechanical (MEMS) accelerometer, a red, green, blue light source and a processor in electronic communication with the MEMS accelerometer and the red, green, blue light source.

In yet another embodiment, a method of assessing integrity of a girth gear tooth in situ is provided, the method comprising using the system described above.

In the method, a plurality of gear teeth may be examined for a surface discontinuity.

In another embodiment, a low VOC or very low VOC cleaning formulation for cleaning a girth gear set is provided, the cleaning formulation comprising about 53% to about 68% w/w hydrotreated light naphtha, about 1% w/w non-ionic surfactant, about 9% to about 19% w/w unsaturated fatty alcohols, about 2% w/w fretting wear lubricant and about 8% to about 10% w/w extreme pressure lubricant.

The cleaning formulation may further comprise a terpene alcohol.

In the cleaning formulation the terpene alcohol may be terpineol.

The cleaning formulation may comprise about 9% to about 15% w/w terpineol.

The cleaning formulation may further comprise about 10% hydrotreated aliphatic naphtha oil.

In another embodiment, an ECA probe for inspecting at least one of a girth gear tooth and a pinion gear tooth is provided, the ECA probe including an at least one Micro Electromechanical (MEMS) accelerometer, a red, green, blue light source and a processor in electronic communication with the MEMS accelerometer and the red, green, blue light source.

In the ECA probe, the probe may be a rigid probe for inspecting the girth gear tooth, the rigid probe including a housing, a sensor layer retained in the housing, a resilient surface retained on the sensor layer, and a sensor zone in the sensor layer, the sensor zone comprising a series of drive coils and a series of sensing coils, both series located proximate the resilient layer, a multiplexer in communication with the series of sensing coils, a plurality of data channels in communication with the multiplexer.

The ECA probe may further comprise a positioning encoder retained in the housing.

In the ECA probe, the probe may be a flexible probe for inspecting the pinion gear tooth.

In yet another embodiment, method of cleaning and inspecting a girth gear set in situ is provided, the girth gear set including a girth gear, which has a plurality of girth gear teeth and a pinion gear, which has a plurality of pinion gear teeth, the cleaning comprising: spraying a low or very low Volatile Organic Compound (VOC) cleaning formulation onto the gear set, the cleaning formulation comprising a non-VOC aliphatic hydrocarbon solvent, an extreme pressure lubricant, a non-ionic surfactant, and a mixture of non-VOC unsaturated fatty alcohols; and continuing to spray the low or very low VOC cleaning formulation on the gear set for sufficient time for the formulation to clean the gear set, thereby providing a so cleaned girth gear and a so cleaned pinion gear; and the inspecting comprising standardizing each of a rigid eddy current sensor array probe and a flexible eddy current sensor array probe with a reference standard; scanning the girth gear teeth with an alternating current using the rigid eddy current sensor array probe; scanning the pinion gear teeth with an alternating current using the flexible eddy current sensor array probe; sending a data set from each probe to a computing device; the computing device analyzing the data sets; and the computing device displaying two or more of a two or three-dimensional image of the data sets on a user interface.

In the method, the spraying may be at low pressure onto the gear set, which is in use.

In the method, the formulation may further comprise a fretting wear lubricant and the spraying may be at high pressure, on a mill turning at inching speed.

In yet another embodiment, a method of examining an at least one pinion gear tooth on site is provided using a system comprising a flexible eddy current sensor array probe in electronic communication with a computing device, the computing device having a processor and a memory, the memory to provide instructions to the processor, the flexible eddy current sensor array probe including flexible layer, a sensor layer retained in the sensor layer and a resilient surface retained on the sensor layer, the method comprising: standardizing the eddy current sensor array probe with a reference standard; scanning the at least one gear with an alternating current; sending a data set to the computing device; the computing device analyzing the data set; and the computing device displaying one or more of a two or three-dimensional image of the data set on a user interface.

The method may further comprise monitoring a scan speed with the ECA probe, the ECA probe including an at least one Micro Electromechanical (MEMS) accelerometer, a red, green, blue light source and a processor, the processor in electronic communication with the MEMS accelerometer and the red, green, blue light source.

In the method, the resilient layer may be a removable Ultra High Molecular Weight adhesive-backed plastic film and the method may further comprise assessing wear of the resilient layer and, if worn, replacing the resilient layer.

The method may be conducted in the absence of re-standardizing the rigid eddy current sensor array probe.

The method may further comprise the computing device archiving the data set.

The method may further comprise multiplexing the data set.

In the method, on site may be a mine site.

FIGURES

DESCRIPTION

Figure 1:
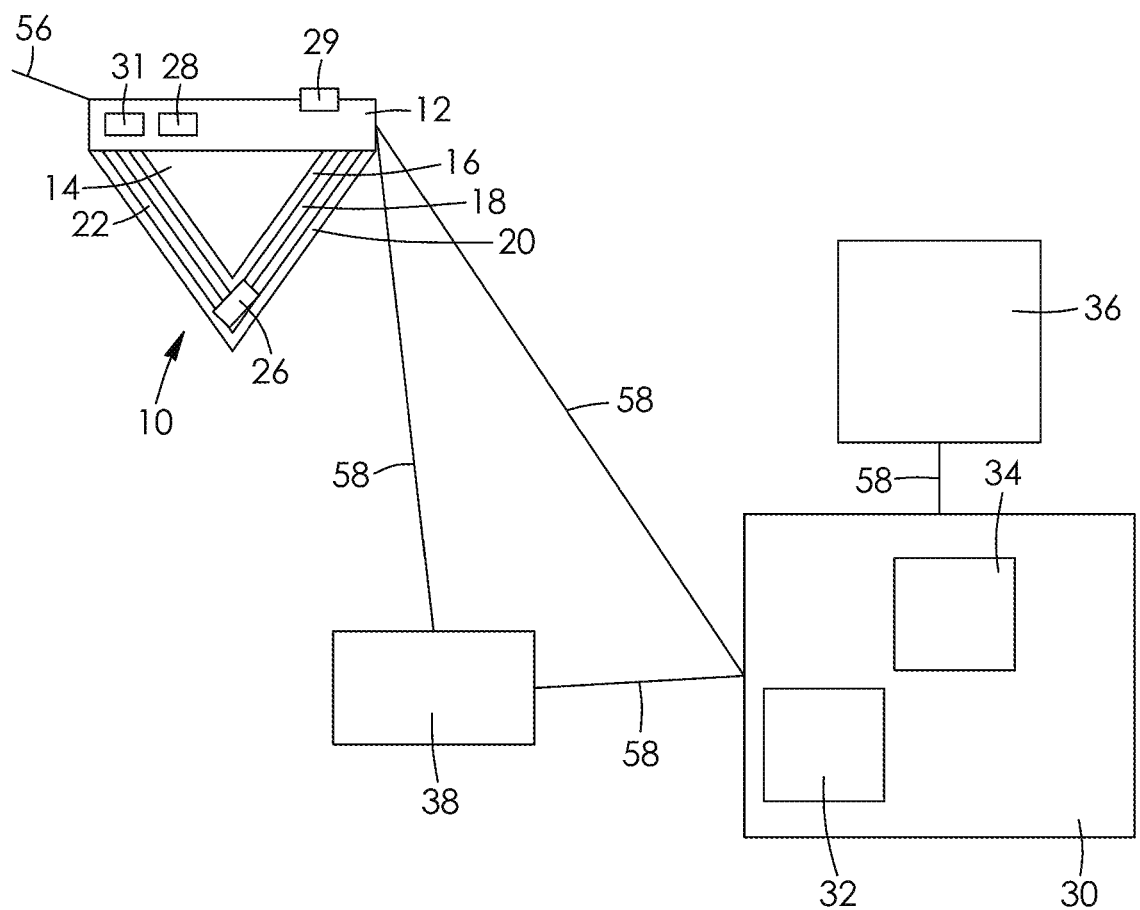
FIG. 1 is a schematic of the system of the present technology.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Theoretical Considerations:

Eddy currents are more concentrated at the surface and decrease exponentially in intensity with distance below the surface of the metal. This effect is known as the "skin effect." The depth at which eddy current density has decreased to about 37% of the surface density, is called the standard depth of penetration (d). At two standard depths of penetration (2d), the eddy current density has decreased to $1/e^2$ squared or 13.5% of the surface density. At three depths (3d), the eddy current density is down to only 5% of the surface density.

The depth of penetration is dependent on test drive frequency, as well as, the test material's conductivity and magnetic permeability. The depth of penetration decreases with increasing frequency, conductivity and permeability. It is important to know the standard depth of penetration because for some testing (like flaw detection) the inspection should be conducted at a frequency that places the depth of any likely flaws at 1d or less where eddy currents are strong. Similarly, in order to detect subsurface defects, and to test highly conductive, magnetic, or thick materials, lower frequencies should be used. When making conductivity tests, the sample should be at least 3d thick so that changes in the thickness of the sample do not affect the measurements. When electrical conductivity in IACS—(International Annealed Copper Standard) and permeability in Henry/mm are known, the standard depth of penetration can be calculated.

Basic Concepts of Eddy Current Array

Eddy Current Array (ECA) technology provides the ability to electronically drive multiple eddy current coils placed side by side in the same probe assembly. Data acquisition is performed by multiplexing the eddy current coils in a special pattern to avoid mutual inductance between the individual coils. Most conventional eddy current flaw detection techniques can be reproduced with an ECA inspection. With the benefits of single-pass coverage, and enhanced imaging capabilities, ECA technology provides a remarkably powerful tool and significant time-savings during inspections.

Multiplexing

Multiplexing is the process by which multiple analog message signals are combined into one digital signal on a shared medium. When eddy current array data is multiplexed, the individual eddy current coils are excited at different times, allowing the system to excite all of the coils in the probe without ever exciting any two adjacent coils at the same time. An undesirable effect known as mutual inductance (magnetic coupling between coils in close proximity) is minimized with the use of an internal multiplexing system to carefully program the exact time that each coil is excited to transmit its eddy current signal. The signals are then reassembled before being displayed as an image. In addition to the enhanced imaging capabilities of multiplexed data, multiplexing allows any individual coil (data) channel to be analyzed after inspection. Multiplexing allows an increased channel resolution, increased coil sensitivity (through the reduction of mutual inductance), and a reduced noise level. This ultimately leads to an improved signal-to-noise ratio.

Definitions:

Computing device—in the context of the present technology, a computing device is any device or instrumentation that has a processor or microprocessor for data acquisition and data analysis. It may be integrated into a single device that also provides the eddy current array with alternating current of one or more suitable frequencies.

Low VOC—in the context of the present technology a low VOC content is about 5% to about 8%.

Very low VOC—in the context of the present technology a very low VOC is less than about 5%, preferably less than about 4%.

Non-VOC—in the context of the present technology non-VOC can include VOC-exempt components.

Detailed Description:

The formulation was developed to meet the requirements of being low VOC or very low VOC (in the present technology is less than 4%) or non-VOC, have a high flash point, be not be classified as a dangerous good, provide good cleaning power for girth gears and protect the gear from scuffing and other damage. The formulation is terpene-free. In one embodiment, the formulation contains up to 13% terpineol.

An extreme pressure additive is included in the formulation (see Tables 1-4). Examples of suitable extreme pressure additives suitable for the present formulation include, but are not limited to Lubrizol 1038, Lubrizol EP additive Anglamol 6043® and Hitec® 350C.

A VOC-exempt hydrocarbon base oil is included in some embodiments. These can be base oils in Group I, II or III.

A fretting/antiwear lubricant is included in some embodiments. The preferred contain phosphate, such as an alkyl phosphate amine or a phosphate ester, or its equivalent. Without being bound to theory, the fretting wear additive provides protection from micro-pitting and wear.

A non-ionic surfactant is included in the formulations. Without being bound to theory, the surfactant improves miscibility of the components of the formulation and, in the situations where the gear is rinsed prior to inspection, with water. Other methods include rinsing with hot water, solvent, detergent or wiping.

A major component of the formulation is a VOC-exempt hydrocarbon-based solvent. Hydrotreated aliphatic light naphtha, for example, but not limited to Shellsol® D80, or its equivalents are the preferred solvent. In order to meet the low VOC, very low VOC or non-VOC end product, the solvent is preferably VOC-exempt. ShellSol D80 is a low viscosity, colorless solvent with a low aromatics content and a mild odor. Product, as produced, meets the volatile organic compound (VOC) exemption criteria and definition of Low Vapour Pressure-VOC as established in California Air Resources Board's Consumer Products Regulation; in the US EPA's National Volatile Organic Compound Emissions Standards for Consumer Products; and in the Model Rule for Consumer Products as adopted by the Ozone Transport Commission (OTC). Due to their low volatility and photochemical reactivity, these LVP-VOCs are fully exempt and non-reportable VOCs in calculations of the VOC contents of regulated consumer product categories.

In the preferred embodiment, unsaturated fatty alcohols are included in the formulation. These typically have a hydrocarbyl chain length of between 6 and 24 carbon atoms. In some embodiments, the unsaturated fatty alcohols have the general structure of R—CH.dbd.CH—(CH.sub.2).sub.7-CH.sub.2OH, wherein R is H or C.sub.2-C.sub.7 alkyl. In some embodiments, the unsaturated fatty alcohol may be an unsaturated alcohol such as 9-decen-1-ol or 9-dodecen-1-ol. In the preferred embodiment, the unsaturated fatty alcohols are made as described in US Publication No. 20150274619 which is incorporated by reference herein, in its entirety.

TABLE 1

Alternative embodiment formulation A for use in cleaning gears.

| Common Name | Concentration % (w/w) | Flash Point (° F.) | VOC |
|---|---|---|---|
| Hydrotreated light naphtha | 70-80 | 176 | NO |
| Extreme pressure lubricant | 8-10 | 83 | NO |
| Unsaturated fatty alcohols | 10-20 | 212 | NO |
| High flash point non-ionic surfactant | 1.0 | 425 | NO |

TABLE 2

Alternative embodiment formulation B for use in cleaning gears.

| Common Name | Concentration % (w/w) | Flash Point (° F.) | VOC |
|---|---|---|---|
| Hydrotreated light naphtha | 70-80 | 176 | NO |
| Extreme pressure lubricant | 8-10 | 83 | NO |
| Terpineol | 1-2 | 190 | NO |
| Unsaturated fatty alcohols | 9-19 | 300 | NO |
| High flash point non-ionic surfactant | 1.0 | 425 | NO |

TABLE 3

Exemplary embodiment formulation G for use in cleaning gears.

| Common Name | Concentration % (w/w) | Flash Point (° F.) | VOC |
|---|---|---|---|
| Hydrotreated light naphtha | 65-80 (67) | 176 | NO |
| Extreme pressure lubricant | 8-10 (10) | 83 | NO |
| Terpineol | 9-15 (13) | 190 | NO |
| Unsaturated fatty alcohols | 9-19 (9) | 300 | NO |
| High flash point non-ionic surfactant | 1.0 (1) | 425 | NO |

TABLE 4

Exemplary embodiment formulation L for use in cleaning gears.

| Common Name | Concentration % (w/w) | Flash Point (° F.) | VOC |
|---|---|---|---|
| Hydrotreated light naphtha | 53-68 (58) | 176 | NO |
| Extreme pressure lubricant | 8-12 (11) | 83 | NO |
| Hydrotreated naphtha oil | 10 (10) | 284 | NO |
| Fretting wear lubricant | 0.5-2 (1) | 172 | ? |
| Terpineol | 9-15 (12) | 190 | NO |
| Unsaturated fatty alcohols | 7-17 (7) | 300 | NO |
| High flash point non-ionic surfactant | 1.0 | 425 | NO |

TABLE 5

Exemplary embodiment formulation M for use in cleaning gears.

| Common Name | Concentration % (w/w) | Flash Point (° F.) | VOC |
|---|---|---|---|
| Hydrotreated light naphtha | 53-68 (68) | 176 | NO |
| Extreme pressure lubricant | 8-12 (11) | 83 | NO |
| Fretting wear lubricant | 0.5-2 (2) | 172 | ? |
| Terpineol | 9-15 (12) | 190 | NO |
| Unsaturated fatty alcohols | 7-17 (7) | 300 | NO |
| High flash point non-ionic surfactant | 1.0 | 425 | NO |

The formulations were tested to determine which formulation provided the best cleaning. The formulations were tested by placing 25 mL asphaltic lubricant in 250 mL formulation. They were allowed to sit for 2 minutes. The combination was then vortexed for 30 seconds and then filtered. The amount of residue (asphaltic lubricant) remaining in the filter was weighed. A second test was done using synthetic lubricant. 25 mL of the synthetic lubricant was placed in 250 mL formulation. This was allowed to sit for 2 minutes. The combination was then vortexed for 30 seconds and then filtered. The amount of residue (synthetic lubricant) remaining in the filter was weighed.

TABLE 6

Cleaning capability of formulations.

| Lubricant | Formulation | Dissolved lubricant (wt %) |
|---|---|---|
| Asphaltic | A | 96.0 ± 1.5 |
| Asphaltic | B | 96.9 ± 1.2 |
| Asphaltic | G | 89.7 ± .74 |
| Asphaltic | L | 81.5 ± 3.3 |
| Synthetic | A | 49.4 ± 8.8 |
| Synthetic | B | 78.8 ± 0.6 |
| Synthetic | G | 92.0 ± 2.0 |
| Synthetic | L | 89.6 ± 0.6 |

Formulations G and L were tested for protecting the gear from scarring using American Society for Testing and Materials (ASTM) D4172. This test method can be used to determine the relative wear preventive properties of lubricating fluids in sliding contact under the prescribed test conditions. Wear, weld point and seizure was measured using ASTM D2783, which relates to the ability of the formulation to protect the gear under extreme pressure. They were compared with a high-VOC, commercially available product that is used as the mill is running at full operating revolutions per minute (15-20). Formulation G performed better than the commercial product with regard to extreme pressure properties.

This suggested that a method could be developed that involved cleaning at inching speed (inching leads to a much higher impulse on the gear teeth as they press against the pitch line of the opposing teeth and can therefore damage the gear). Formulation G was not quite as protective as the commercial product with regard to relative wear preventative properties of the formulation in sliding contact. However, as noted below, the cleaning method used reduces the amount of sliding contact in comparison to standard methods from about 1350 to 2400 revolutions (1.5 to 2 hours at 15-20 RPM) to two revolutions.

TABLE 7

Exemplary formulation G23C.

| Common Name | Concentration % (w/w) |
|---|---|
| Hydrotreated light naphtha | 53-68 (59) |
| Extreme pressure lubricant | 3-14 (13) |
| Fretting wear lubricant | 0.5-2 (2) |
| Base oil | 10 |
| Terpineol | 9-15 (10) |
| Unsaturated fatty alcohols | 4-17 (5) |
| High flash point non-ionic surfactant | 1.0 |

The fretting wear lubricant contained phosphate esters. The base oil was a Group II base oil. The inclusion of these two components led to significant improvements in the performance of the formulation with regard to protecting the gear during cleaning. This was tested using ASTM D2783 and ASTM D4172.

Cleaning of the gear with the formulations of the present technology can be done in about an hour. The gear is inched during the cleaning, hence reducing the chance of damaging the gear. The formulation is sprayed on the gear using high pressure (about 1000 to about 5000 psi, preferably about 2000 to about 3500 psi). The formulation blends with the normal lubricant. The gear need only travel through one to three rotations, preferable two rotations, thus reducing the potential for damage to the gear teeth. For ECA, Electromagnetic Acoustic Transducer (EMAT), ultrasonics and Phased Array Ultrasonics (PAUT), inspection can occur without any further treatment of the gear (With Ultrasonics and PAUT a couplant needs to be used for the inspection). Formulation K leaves a thin film on the gear, which enhances sliding of the probe over the surface being inspected. The gears need not be rinsed or wiped after cleaning, hence the method is rinse-free and is a one-step method.

Based on the results, formulation M will be expected to provide better wear, weld point, load wear and scarring as well as good dissolving capabilities.

In an alternative embodiment, the gears are wiped or rinsed after cleaning and inspected using Magnetic Particle or Dye Penetrant inspection.

In an alternative embodiment, spraying is done at low pressure while the mill is in use.

In the preferred embodiment, inspection is done with ECA. With regard to inspecting the girth gear, as shown in FIG. 1, a rigid probe, generally referred to as 10, has a housing 12, an optional shoe 14, a sensor layer 16, a resilient surface 20 and a sensor zone 18 within the sensor layer 16 proximate the resilient surface 20. The sensor layer 16 is preferably about 2 to about 3 mm thick. The probe output is preferably a high frequency, ranging from about 50 kiloHertz (kHz) to about 500 kHz. The shoe 14, if present, is shaped to conform to the shape of the article being tested. There are three probes for the girth gear—a small probe, a medium probe and a large probe. The resilient surface 20 is long wearing and resistant to scratching. The resilient surface 20 is preferably a plastic polymeric material, such as, but not limited to Ultra-high-molecular-weight polyethylene (UHMW), High-density polyethylene (HDPE), poly vinyl chloride or similar, slippery plastic. A preferred surface is a removable UHMW adhesive-backed flexible plastic or Teflon® film, which is about 0.10 to about 0.25 mm thick. It has a low coefficient of friction and a high abrasion resistance. If a non-adhesive resilient surface is employed, then it is glued to the sensor layer 16 with a releasable adhesive layer 22. This allows for replacement of the resilient surface 20, as needed. The rigid probe 10 also has a positioning encoder 26 embedded within it. Locating the encoder within the probe reduces the overall bulk of testing equipment at the gear (the encoder is usually attached to the outside of the probe and makes scanning more awkward, thus more prone to error). The probe 10 also has at least one and as many as three Micro Electromechanical System (MEMS) accelerometers 28 that are in electronic communication with an external computing device 30 and firmware or microprocessor or microcontroller 31 in the probe 10. The microcontroller quantizes the outputs of the accelerometer. This allows the scan speed to be monitored. Should the speed go above or below the accepted range of scanning speed, which is selected by the user, an audible or visual signal will be emitted. A red blue green (RBG) light source 29 on the probe 10 is in electronic communication with the computing device 30 and indicates that the speed is too slow (blue), too fast (red) or within range (green) in response to feedback from the computing device 30 or processor 31.

The rigid probe 10 is in communication with the computing device 30, the computing device 30 having a processor 32 to receive instructions from a memory 34. The MEMS accelerometer 28 is also in communication with the computing device via the microprocessor 31. A software programme analyses the acceleration data and calculates velocity. Random noise collected with the measurement data are filtered with a Kalman filter in the software programme.

The computing device 30 is in electronic communication with a user interface 36. The eddy current array probe 10 and computing device 30 are used in the method of the present technology and are provided as a system.

The rigid probe 10 is also in electronic communication with electronic instrumentation 38 that is capable of energizing the coils 40 of the sensor zone 18 with alternating current of one or more suitable frequencies and is capable of measuring changes in the impedance of each coil 40 in the sensor zone 18. The instrumentation 38 includes a capability to convert the impedance information into physical property values for the material under examination, including the lift-off at each point in the B-scan or C-scan. The instrumentation 38 is in electronic communication with the computing device 30. The lift-off can vary from about 0 mm up to about 3 mm to about 4 mm from the inspected surface.

Figure 2A:
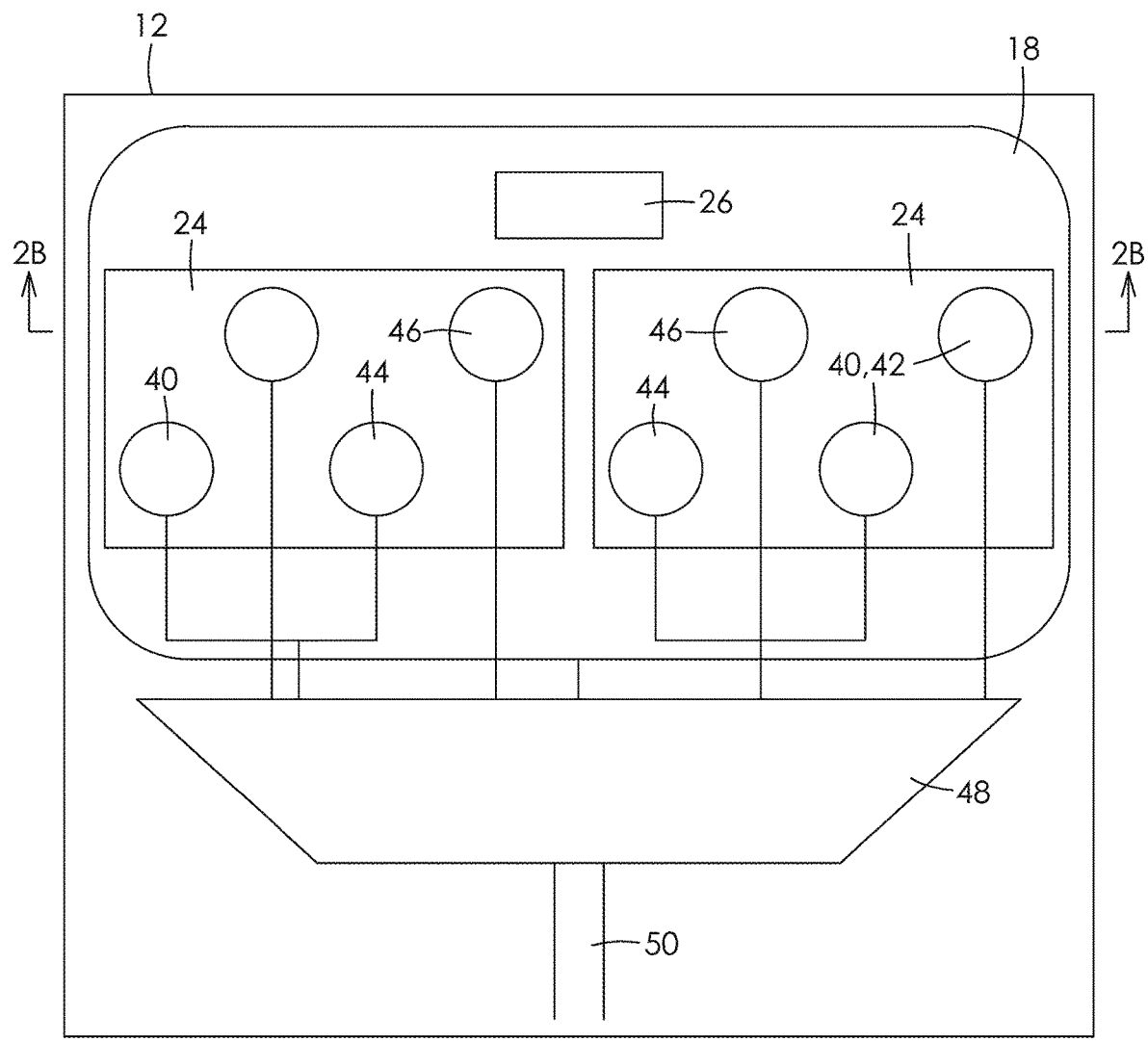
FIG. 2A is a schematic of the rigid probe of the present technology.
Figure 2B:
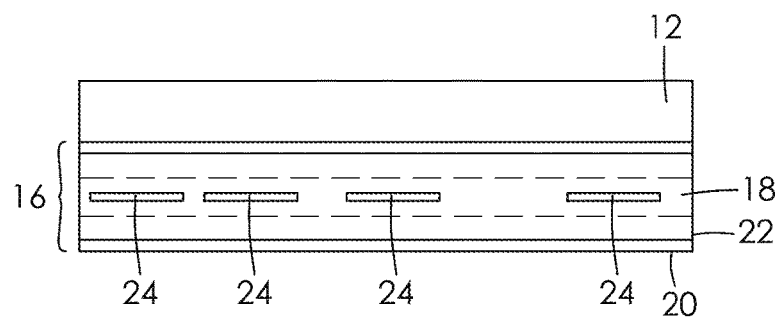
FIG. 2B is a cross sectional view at line 2B in FIG. 2A.

As shown in FIGS. 2A and 2B, the sensor zone 18 is comprised of a plurality of sensors 24, embedded in the sensor layer 16. Each sensor 24 has a plurality of coils 40 to form an eddy current array, generally referred to as 42. There are at least two rows of coils 40 offset by half a coil 40. The array 42 is designed to cover the surface to be analyzed. There are drive coils 44 and sensing coils 46. There is also a multiplexer 48 in the housing 12, in or proximate the sensor layer 16. The signals from the eddy current array 42 pass through the multiplexer 48 and then to data channels 50. A multiplexer 48 is used when the number of sensing coils 46 for impedance measurement is greater than the number of channels 50. It is housed in the housing 12. Returning to FIG. 1, the probe 10 is powered by an electrical power cord 56. Communication cables 58 allow for the electronic communications.

Figure 3:
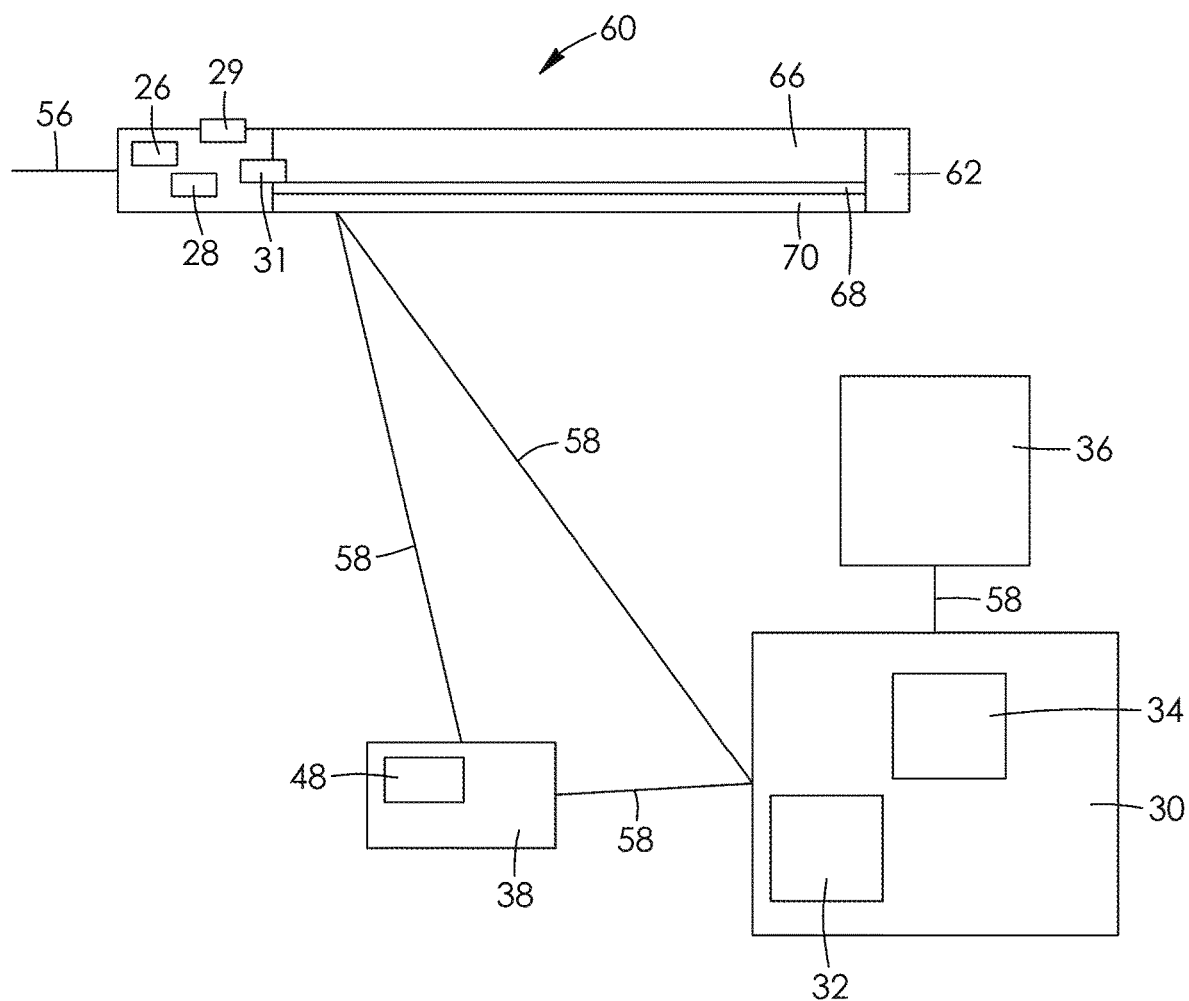
FIG. 3 is a schematic of the flexible probe of the present technology.

With regard to inspecting the pinion gear, as shown in FIG. 3, a flexible probe, generally referred to as 60, a flexible layer 66, a sensor layer 68 and low friction protective layer 70, which is preferably a Teflon® film of about 0.10 to about 0.25 mm thick. The flexible layer 66, sensor layer 68 and low friction protective layer 70 are an elongate strip. The low friction protective layer 70 has a low coefficient of friction and a high abrasion resistance. A preferred layer 70 is a removable UHMW adhesive-backed flexible plastic or Teflon® film. The probe output is preferably a high frequency, ranging from about 50 kilo Hertz (kHz) to about 500 kHz. The flexible layer 66 conforms to the shape of the article being tested. The flexible layer 66 and sensor layer 68 are flexible and can be bent to the shape of the article being assessed. The flexible probe 60 also has at least one and as many as three Micro Electromechanical System accelerometers 28 that are in electronic communication with an external computing device 30 and firmware or microprocessor or microcontroller 31 in the probe 60. The microcontroller 31 quantizes the outputs of the accelerometer 28. This allows the scan speed to be monitored. Should the speed go above or below the accepted scan speed, which is selected by the user, an audible or visual signal will be emitted. A red blue green (RBG) light source 29 on the flexible probe 60 is in electronic communication with the computing device 30 and indicates that the speed is too slow (blue), too fast (red) or within range (green) in response to feedback from the computing device 30. An encoder 26 is attached to the probe 10.

The flexible probe 60 is in communication with the computing device 30, the computing device 30 having a processor 32 to receive instructions from a memory 34. The MEMS accelerometer 28 is also in communication with the computing device via the microprocessor 31. A software programme analyses the acceleration data and calculates velocity. Random noise collected with the measurement data are filtered with a Kalman filter in the software programme.

The computing device 30 is in electronic communication with a user interface 36. The eddy current array probe 60 and computing device 30 are used in the method of the present technology and are provided as a system.

The probe 60 is also in electronic communication with electronic instrumentation 38 that is capable of energizing the coils 40 of the sensor zone 18 with alternating current of one or more suitable frequencies and is capable of measuring changes in the impedance of each coil 40 in the sensor zone 18. The instrumentation 38 includes a capability to convert the impedance information into physical property values for the material under examination, including the lift-off at each point in the B-scan or C-scan. The instrumentation 38 is in electronic communication with the computing device 30. The electronic instrumentation 38 houses a multiplexer 48.

Figure 4:
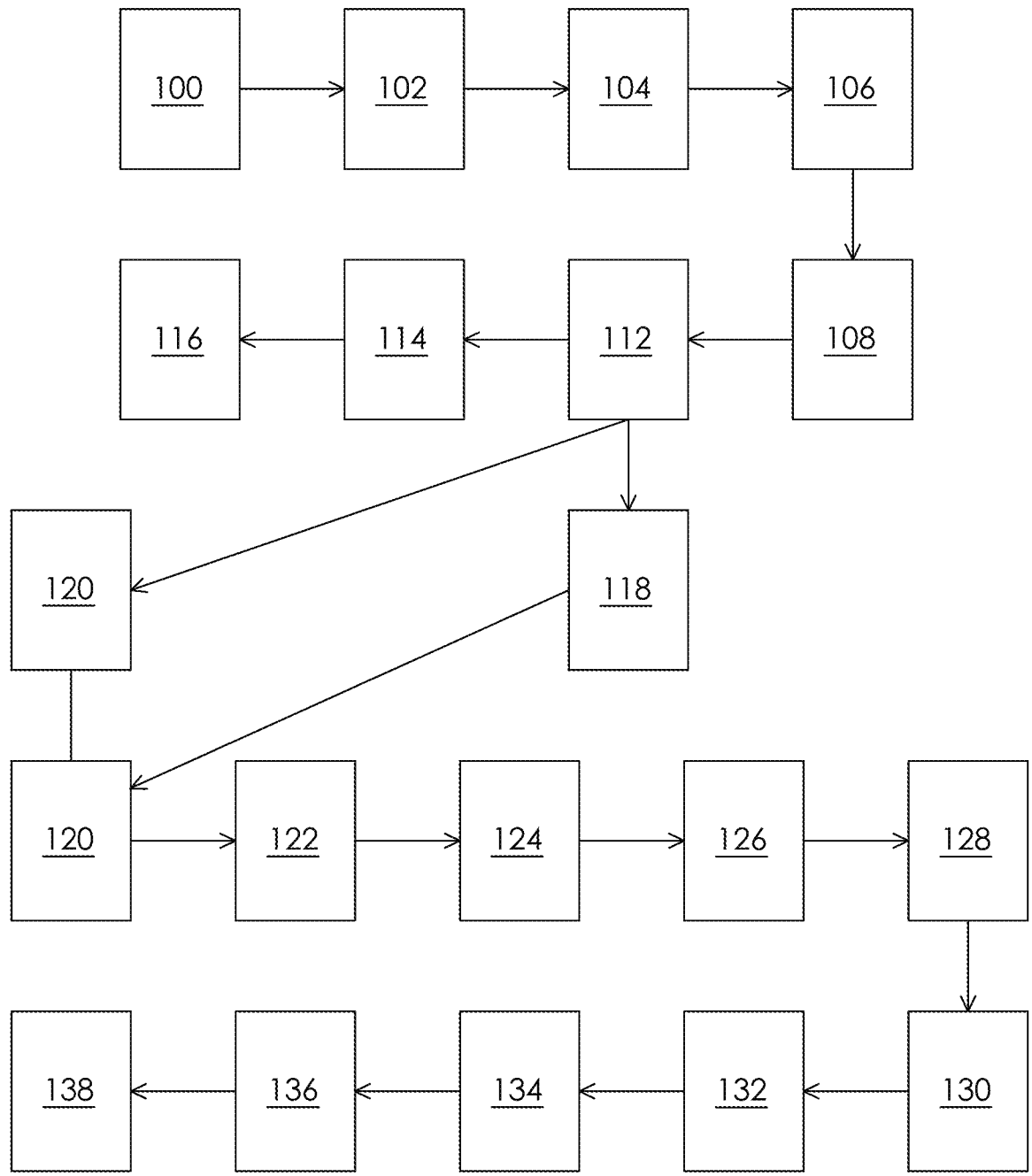
FIG. 4 is a flow chart of the method of cleaning and inspecting a gear.

An overview of the method is shown in FIG. 4. The method of inspecting a gear takes about 8 hours. The method is used for detecting anomalies and defects in the gears, such as, but not limited to indications, discontinuities and defects. The part to be assessed is cleaned 100. A reference standard is used to standardize 102 all the channels 30 of the array 22. The probe 10, 60 is placed 104 on the surface of the part to be assessed, and, in the case of the flexible probe, is molded 106 to the surface as the surface is scanned 108 with an alternating current. Testing is done in situ. The addendum, dedendum and root of the gear teeth are all assessed. For the girth gears, the method and the system of the present technology provide a solution to assessing such gears because of the replaceable resilient layer, the presence of both the encoder and multiplexer in the probe and the accuracy and precision provided by the MEMS accelerometer. For pinion gears, the teeth of the gears are arranged in a helix. The angle of the teeth is between about 2 degrees to about 15 degrees. Pinion gears are more difficult to assess because of the helix angle. For these gears, the method and the system of the present technology provide a solution to assessing such gears because of the flexibility of the probe 60, the protection and low friction afforded by the Teflon® film and the accuracy and precision provided by the MEMS accelerometer.

The scan speed is controlled 112 by the operator, and is monitored 114 with the MEMs accelerometer 28. The RGB light source indicates 116 whether the speed is within the correct range. If there are no defects the alternating current produces 118 a uniform magnetic field above the surface. If there are defects, the alternating current leads 120 to a non-uniform magnetic field. The signal provides 122 position and depth information. This signal is then processed 124 by the processor 52 using instructions provided 126 by the memory 54 to provide 128 depth, length and position information with regard to cracks. Data can be analyzed from individual coil channels or for the entire surface. A three-dimensional image is produced 130 and displayed 132 on the user interface 55. The data are archived 134 in the memory 54 for future reference. The probe 10, 60 will detect both subsurface and surface discontinuities, thereby providing a complete assessment of the integrity of the gear. In the case of the rigid probe 10, the resilient layer is examined 136 for wear and is replaced 138 as needed. There is no need for re-standardization as the resilient layer is preferably a removable UHMW adhesive-backed flexible plastic film, which is provided as a standardized film of consistent thickness or, less preferably, is a non-adhesive resilient surface that is glued to the sensor layer with a releasable adhesive layer. The use of a replaceable resilient surface provides three advantages. The first is that the resilient layer/surface is all that needs to be replaced, thus reducing the cost that is normally associated with probe wear. The second is that there is no need for re-standardization, as the layer/surface can be replaced when the wear is still within tolerance limits. The third is that the replacement does not alter probe performance, as it is a standardized thickness, therefore there is no need for re-standardization after replacement of the resilient layer/surface.

If desired, a magnetic particle examination can also occur. This is not essential as it does not provide any additional information, but allows one to display a crack in a picture for a report.

Any inspection method is usually followed with a visual inspection to view the gear teeth for contact patterns to ensure that the gear set is correctly aligned. If the gear set is out of alignment, it is adjusted.

In another embodiment, inspection is done visually or with Magnetic Particle or Dye Penetrant Inspection methods. For these methods, the gears need to be wiped.

Example 1

TABLE 8

Exemplary formulation G23F and G23G.

| Common Name | Concentration % (w/w) | Concentration % (w/w) |
|---|---|---|
| Hydrotreated light naphtha | 53-68 (65.8) | 60.8 |
| Extreme pressure lubricant | 3-14 (5) | 3-14 (10) |
| Fretting wear lubricant | 3.2 | 3.2 |
| Base oil | 10 | 10 |
| Terpineol | 9-15 (10) | 10 |
| Unsaturated fatty alcohols | 4-17 (5) | 5 |
| High flash point non-ionic surfactant | 1.0 | 1.0 |

A first fretting wear lubricant which has dodecyl phenyl phosphate and about 6% phosphorus, is added at 2% and a second fretting wear lubricant compound containing ethylhexyl phosphate at about 39% to about 51% and about 11% to about 12% phosphorus is added at 1.2%. These are both anti wear/fretting wear lubricants.

The formulations G23F and G23G will pass or perform well in the ASTM D5182 (FZG test), in addition to performing better than the commercial product with regard to extreme pressure properties.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A method of examining an at least one girth gear tooth on site using a system comprising a rigid eddy current sensor array probe in electronic communication with a computing device, the computing device having a processor and a memory, the memory to provide instructions to the processor, the rigid eddy current sensor array probe including a housing, a sensor layer retained in the housing, a resilient surface retained on the sensor layer, and a sensor zone in the sensor layer proximate the resilient surface, and comprising a series of drive coils and a series of sensing coils, the method comprising: cleaning the at least one girth gear tooth to expose a surface to be examined; standardizing the eddy current sensor array probe with a reference standard; scanning the surface to be examined of at least one gear tooth with an alternating current; sending a data set to the computing device; the computing device analyzing the data set; and the computing device displaying a three-dimensional image of the data set on a user interface.

2. The method of claim 1, further comprising examining another at least one girth gear tooth in the absence of re-standardizing the rigid eddy current sensor array probe.

3. The method of claim 2 further comprising the computing device archiving the data set.

4. The method of claim 3, further comprising multiplexing the data set.

5. The method of claim 4, wherein a plurality of gear teeth is examined for a surface discontinuity.

6. The method of claim 5, wherein the surface discontinuity is one or more of pitting, scuffing and cracks.

7. The method of claim 6, wherein the method is rinse-free.

8. The method of claim 1, further comprising examining an at least one root, an at least one dedendum and an at least one addendum.

9. The method of claim 8, wherein on site is a mine site.

10. The method of claim 9, wherein the mill is inched during cleaning.

11. The method of claim 10, wherein the mill is inched between one to about three revolutions.

12. The method of claim 11, wherein the cleaning the at least one girth gear is by spraying a non-Volatile Organic Compound (non-VOC) cleaning formulation onto the gear tooth, the cleaning formulation comprising a non-VOC aliphatic hydrocarbon solvent, an extreme pressure lubricant, a fretting wear lubricant, and a non-ionic surfactant.

13. The method of claim 12, wherein the spraying is at a pressure of about 2000 to about 5000 psi.

14. A method of examining an at least one girth gear tooth on site using a system comprising a sensor selected from the group consisting of an Eddy Current Array (ECA) probe, a Phased Array Ultrasonic (PAUT) probe, an Electromagnetic Acoustic Transducer (EMAT), an Alternating Current Field Measurement (ACFM) probe and a 3 dimensional Laser Scanner in electronic communication with a computing device, the computing device having a processor and a memory, the memory to provide instructions to the processor, the method comprising: cleaning the at least one girth gear tooth to expose a surface to be examined; standardizing the sensor with a reference standard; scanning the surface to be examined of at least one gear tooth; sending a data set to the computing device; the computing device analyzing the data set; and the computing device displaying a three-dimensional image of the data set on a user interface.

15. The method of claim 14, wherein the sensor is a rigid Eddy Current Array probe.

16. A system for assessing integrity of a girth gear on site, the system comprising: a rigid eddy current sensor array probe, the eddy current sensor array probe including a housing, a sensor layer retained in the housing, a resilient surface retained on the sensor layer, and a sensor zone in the sensor layer, the sensor zone comprising a series of drive coils and a series of sensing coils, both series located proximate the resilient layer, a multiplexer in communication with the series of sensing coils, a plurality of data channels in communication with the multiplexer; a computing device in electronic communication with the series of drive coils, the computing device including a processor and a memory, the memory to provide instructions to the processor; and a user interface.

17. The system of claim 16, wherein the series of sensing coils are arranged in an at least two rows, the at least two rows offset by a half of a coil.

* * * * *